United States Patent [19]

Huang

[11] 3,712,252
[45] Jan. 23, 1973

[54] SEEDLING GROWING AND HANDLING DEVICE

[75] Inventor: Barney K. Huang, Raleigh, N.C.

[73] Assignee: Research Corporation, New York, N.Y.

[22] Filed: Nov. 6, 1970

[21] Appl. No.: 87,558

[52] U.S. Cl..................................111/2, 47/34.13
[51] Int. Cl...............................................A01c 11/02
[58] Field of Search..........................111/1–3; 47/34, 47/34.13, 37

[56] References Cited

UNITED STATES PATENTS

| 3,028,705 | 4/1962 | Howard | 47/34.13 |
| 3,446,164 | 5/1969 | Huang et al. | 111/3 |
| 152,758 | 7/1874 | Mills | 47/34.13 |
| 3,035,369 | 5/1962 | Helfert | 47/34.13 |

FOREIGN PATENTS OR APPLICATIONS

| 843,037 | 7/1952 | Germany | 111/3 |

Primary Examiner—Robert E. Bagwill
Attorney—Stowell & Stowell

[57] ABSTRACT

A seedling growing and handling device is provided and includes a tray-like structure consisting of a continuous sheet of material formed into a multiplicity of seed growth zones; each of the zones comprising a single confining wall defined by a hollow open ended truncated cone; and a web of the material of the sheet joining the lower larger diameter ends thereof into a continuous structure such that seedlings grown in the zone may be readily removed from the lower larger diameter ends with a minimum disturbance of the plants. The invention also contemplates the automatic transplanting of the seedlings from the device.

1 Claim, 5 Drawing Figures

PATENTED JAN 23 1973

INVENTOR
BARNEY K. HUANG

BY Stowell & Stowell
ATTORNEYS

INVENTOR
BARNEY K. HUANG

BY
Stowell & Stowell
ATTORNEYS

SEEDLING GROWING AND HANDLING DEVICE

BACKGROUND OF THE INVENTION

Tobacco, rice, celery, cabbage, and tomato are for example crops of considerable economic importance which require a great amount of hand labor in pulling the plants from nursery beds and transplanting them into the field. The results of hand transplanting are not always satisfactory since numerous plants may be retarded in growth or die due to root breakage.

After extensive research into the transplanting losses of tobacco and into their possible solutions an automatic transplanter as disclosed and claimed in U.S. Pat. No. 3,446,164 was developed. The transplanter was designed to place potted plants at predetermined intervals in a field thus increasing the survival rate, eliminating human error in the operation, and reducing labor requirements.

Notwithstanding the benefits of the automatic transplanting machine the economic production of a large number of uniform potted plants coupled with their efficient transfer to the transplanter have presented major problems. Furthermore, the high moisture loss of potted plants in nursery beds is also a problem that required improvement.

THE PRESENT INVENTION

The present invention is directed to an improved seedling growing and handling means which:

1. Provides an efficiently shaped pot in which to produce potted plants of uniform growth;
2. Eliminates the operation of pulling seedlings from nursery beds and reduces labor requirements in the plant handling operation;
3. Reduces moisture loss of potted plants in nursery beds to a minimum which results in a higher temperature in the growth media and root system for better plant growth; and
4. Adapts to mechanical transplanting.

The invention for growing and handling seedlings generally consists of a plural opening growth and handling tray and a bottom plate. The tray can be made from a thin plastic sheet or metal foil at such a low price that it can be either reused or discarded. The plural opening growth and handling tray consists of many conically shaped or pyramid shaped cups tapered upwards with both ends open. Since the plant roots develop toward the bottom of the pot, a large bottom not only provides a more desirable shape for root growth but also permits a potted plant to drop out easily at the time of transplanting. This pot shape also reduces the exposure of growth media to a minimum so that the moisture loss can be minimized.

The growing and transplanting of seedlings involves (1) filling the plural openings in the handling tray with a growth media such as soil mix, peat mix, vermiculite mix, etc., (2) planting a seed in each of the individual openings or placing a preseeded growth media in each opening, and (3) creating an environment conducive to seed germination and plant growth.

At the time of transplanting a plate is inserted under the tray and the tray may then be transferred to the indexing frame of an automatic transplanter such as described in U.S. Pat. No. 3,446,164, Huang et al. The tray is progressively shifted by the indexing frame of the transplanter longitudinally and laterally in increments equal to the distance of a single cup. As each potted seedling is indexed to an opening in a bearing plate, it drops to the ground through a guide pipe by gravity and when desired with the aid of suction force. Thus, the potted seedlings in the tray can be planted directly at the rate of travel of the transplanter and the plants may be systematically planted at predetermined spaced intervals.

Thus, the present invention provides a seedling growth and handling system for uniform plant growth and simplifies seedling handling operations to reduce labor and increase plant stand reliability.

BRIEF DESCRIPTION OF DRAWINGS

The invention will be more particularly described in reference to the drawings wherein.

DESCRIPTION OF ILLUSTRATED EMBODIMENT

Figure 1:
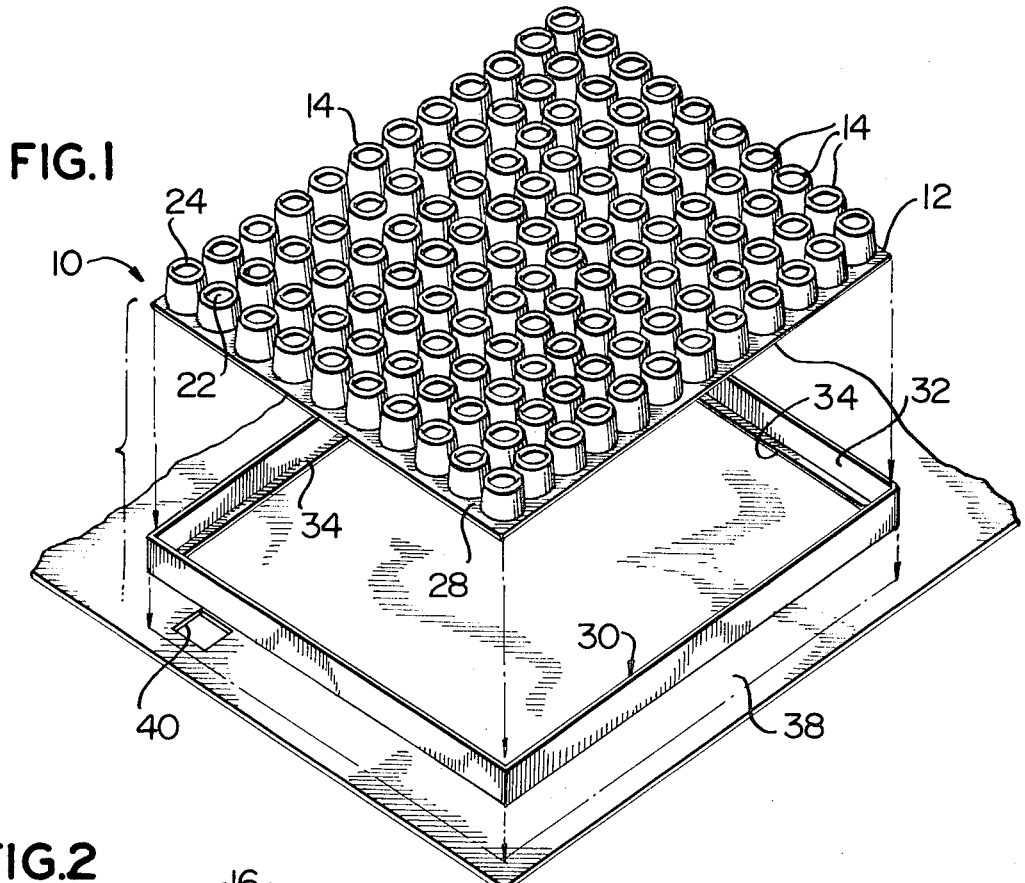
FIG. 1 is an exploded perspective view of the improved seedling growth tray, an index frame and a bearing plate.
Figure 2:
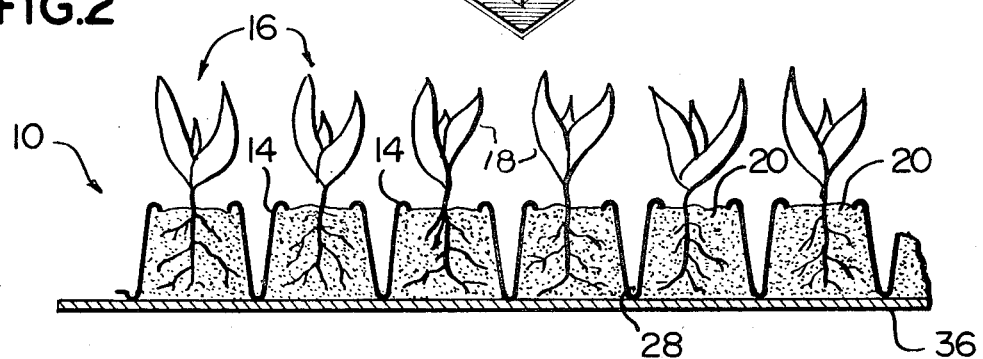
FIG. 2 is an enlarged, fragmentary sectional view of the tray illustrated in FIG. 1 showing seedling in seedling growth spaces.
Figure 3:
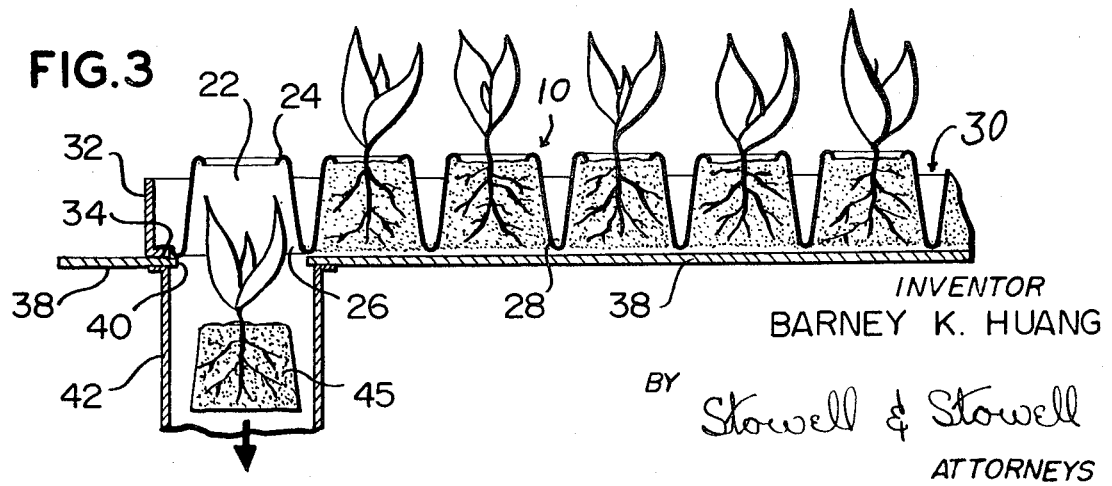
FIG. 3 is a view showing the release of one of the seedlings through a discharge tube which may be associated with an automatic transplanting apparatus.

Referring to the drawings and in particular FIGS. 1 through 3 thereof 10 generally designated an embodiment of the improved seedling growing and handling tray of the invention. The tray 10 includes a continuous sheet 12 which is formed into a multiplicity of seedling growing zones 14, with the seedlings therein being generally designated 16 and having leaf and stem portions 18 and root systems 20.

The sheet material 12 may comprise plastic, sheet metal such as aluminum foil, paper which has been coated or treated to render it water resistant, fiber board and the like.

The sheet stock 12 may be formed into the multiplicity of seedling growing zones by molding, pressing, vacuum forming etc., depending to some extent on the composition or material of the sheet stock.

As illustrated in the drawings each of the seedling growth zones 14 comprises a single confining wall in the shape of a hollow open ended truncated cone or pyramidal like structure. The top open end 22 is provided with a recurved lip 24 or a thickened rounded edge which assists in retaining the shape of the opening when the sheet stock from which the tray is formed is thin and light in weight. This also eliminates the sharp edge at the top end of each zone and thus prevents injuring the seedlings as they drop through the openings during transplanting. The growth zones 14 are interconnected adjacent the lower open ends 26 by a continuous web 28 of the same material as that forming the walls of the growth zones, or of a different material if it facilitates construction of the tray.

An important consideration in forming each of the growth zones is the provision of a larger lower opening 26 than top opening 22 with smoothly tapered walls therebetween so that a seedling may be removed from the lower end of each zone with substantially no disturbance to the root system of the plant being removed as to be more fully described hereinafter.

In the preferred embodiment the conical growth zones 14 are formed or impressed in the sheet material 12 in regular straight rows so that each zone may be relatively simply and mechanically indexed over one or more discharge chutes when it is desired to transplant the seedlings from their temporary and initial growing zones to a field or the like generally final growing area.

From the foregoing description of the seedling growth tray it will be recognized by those skilled in the art that by proper choice of the material of construction a very inexpensive seedling growth tray may be provided so that the tray may be discarded once the seedlings have been removed from the seedling growth zones or a plural use device may be constructed. The filled and seeded trays may be laid on the ground or any flat surface to grow potted plants in which case at the time of transplanting a bottom plate 36 is inserted under the tray 10, and the tray 10 is transferred into the indexing frame 30 of the automatic transplanter by pulling out the bottom plate 36 so that the tray lays flat on the bearing plate 38 of the transplanter. The bottom plate 36 can be used again and again to transfer other trays into the indexing frame 30. In other words, the tray assembly 10 can be laid on the plate 36 during the growth period of the plants and until transplanting time, or the tray assembly 10 can be laid directly on the ground or on any other substantially flat supporting surface without the plate 36. At transplanting time, the plate 36 can be easily inserted under the tray or the tray can be placed on top of the plate 36 which serves as a transferring means for transferring the entire tray carried seedlings. In this way, the number of plates 36 required would be equal only to the number of trays 10 to be transferred at any given time and it would not be necessary to have one plate for each tray.

The plate 36 acts as a supporting and transferring means for moving a seedling tray assembly 10 to the transplanter. In setting the tray 10 on the indexing frame 30 of the transplanter, one simply pulls the plate out from under the tray 10 which then rests on the bearing plate 38 of the transplanter and is ready for the pulling out of the seedlings in one by one fashion from the open major lower ends of the growth zones using suction and gravity forces for immediate transplanting.

The frame member 30, which is the indexing frame of, for example, an automatic transplanting machine, includes an upstanding edge portion 32 and an inturned edge portion 34 upon which the edges of the web 28 of the sheet 12 rests as more clearly shown in FIG. 3 of the drawings.

The bottom plate 36 may be included in the assembly at the time the seeds or seedlings are placed in the growth zones 14 of the tray or the plate 36 may be inserted under the tray only at the time of transplanting as hereinbefore set forth and the tray is to be transferred to, for example, the indexing frame of an automatic transplanting machine.

Referring now to FIG. 3 the plant tray assembly is illustrated positioned in an indexing frame 30 and on a bearing plate 38 of a planter. The bearing plate 38 is provided with an open zone or area 40 below which depends a drop tube 42. By sequentially moving the tray, including frame 30, such that one opening 26 registers with the opening 40 in plate 38 each time a seedling is to be planted the selected potted seedling discharges from its growing zone 14 with substantially no disturbance to its growth media or its root system as illustrated at 45 in FIG. 3 of the drawings.

Figure 4:
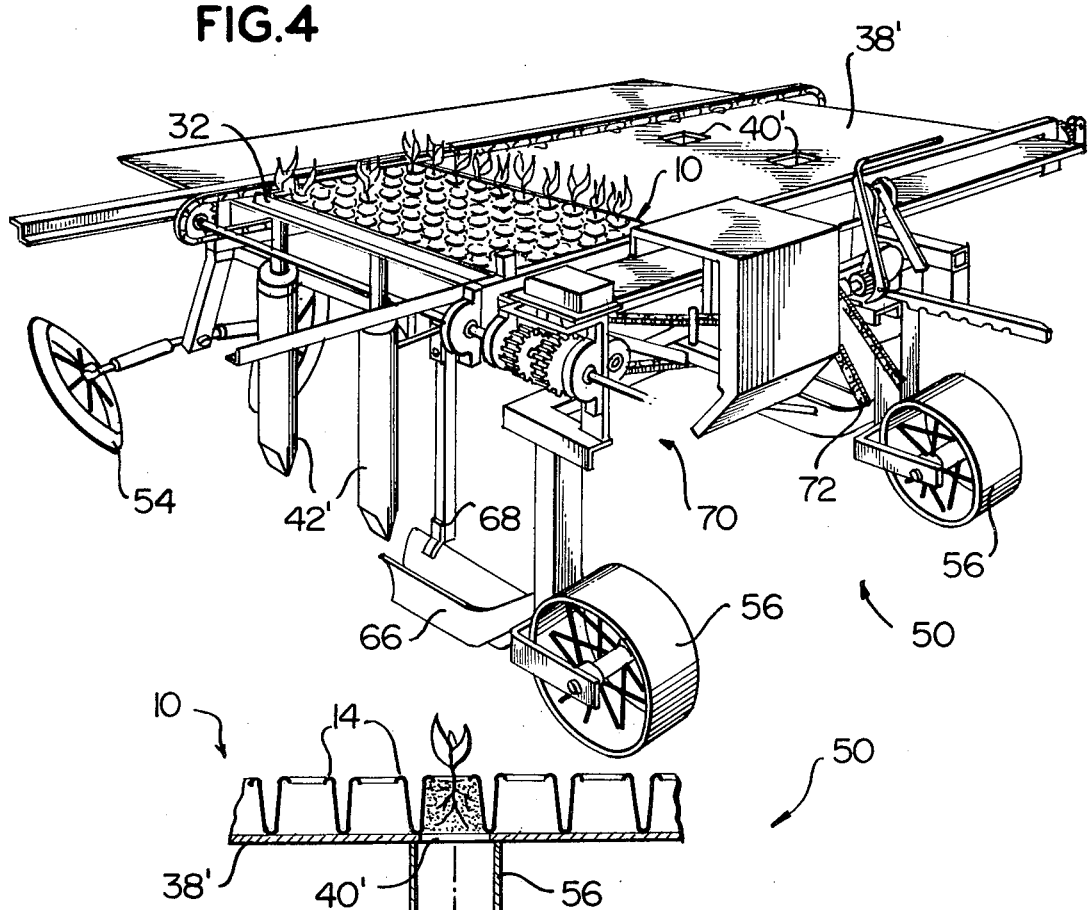
FIG. 4 is a perspective view of an automatic transplanter carrying one of the seedling growth trays of the invention.
Figure 5:
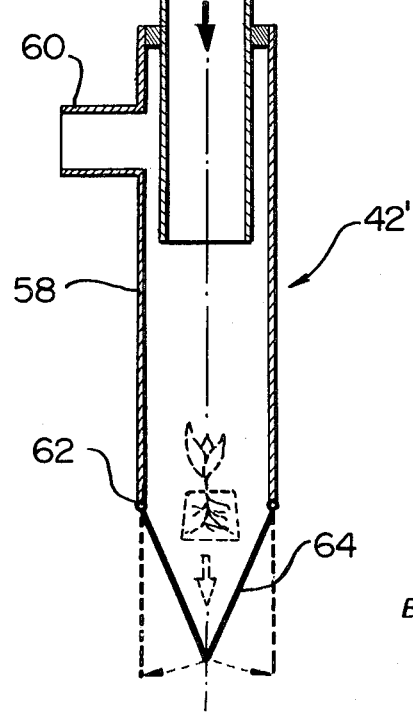
FIG. 5 is an enlarged, fragmentary sectional view of a portion of the transplanter illustrated in FIG. 4.

As hereinbefore set forth the seedling growing and handling device of the invention may be very conveniently employed with automatic transplanting machines such as disclosed and claimed in U.S. Pat. No. 3,446,164 Huang et al. and as briefly illustrated in FIGS. 4 and 5 hereof. Referring to FIGS. 4 and 5, 50 generally designates an automatic seedling transplanting machine which includes a bearing plate 38' supported above the ground on ground engaging press wheels 54 and depth control wheels 56.

The machine 50 is adapted to support and index a plurality such as four of the seedling growing and handling devices 10 and to this end the bearing plate 38' is provided with four indexing openings 40' and four drop pipes or tubes 42'. As more clearly shown in FIG. 5 the drop pipes 42' comprise a first tube 56 which is secured to the bearing plate 38' and a lower, larger diameter tube 58. The tube 58 is connected to a source of reduced pressure via conduit 60 whereby suction assists in the discharge of the seedlings from their respective growth zones 14 when the growth zones appear over an index opening 40' in the bearing plate 38'. In order to maintain a zone of reduced pressure within the tubes 56 and 58 the lower end 62 of tube 58 is provided with a pair of swingably mounted drop doors 64.

The transplanter also includes for example "ground openers" 66 which are held in proper horizontal alignment by adjustable support members 68.

Power for operating the vacuum pumps and the indexing mechanism 70 is obtained for the illustrated automatic transplanter from a power take-off of a towing tractor, not shown, via chain drive 72 details of which are found in my prior U.S. Pat. No. 3,446,164. The power for a hydraulic indexing mechanism can also be provided by the tractor hydraulic system.

It is obvious that the present invention has the advantages of accomplishing the transplanting of plants much faster and with a much greater rate of survival than has hereinbefore been possible while at the same time reducing the labor cost involved to the very minimum. Further with the improved method of raising the young plants to the stage of transplanting, mature crops of uniformed size and quality can be grown.

The present invention may, of course, be carried out in other specific ways than those herein set forth without departing from the spirit and the essential characteristics of the invention. The present embodiments are therefore, to be considered in all respects as illustrative and not restrictive and all changes coming within the meaning and equivalency range of the appended claims are intended to be embraced therein.

Further in the claims the term conical or truncated cone mean and include not only right circular conoids but also truncated pyramidal configurations having three or more plane sides.

I claim:

1. In combination with an automatic seedling transplanter having a substantially horizontally disposed bearing plate provided with a vertically disposed drop tube through which seedlings pass in one by one fashion and having means for moving the seedlings into sequential dropping relation with said drop tube, a seedling growing and handling tray adapted to be placed on and moved over the bearing plate and comprising a continuous, one-piece, sheet of material having a top and a bottom and formed into a multiplicity of vertically upstanding side by side seed growth zones; each of said zones being composed of a single upstanding and smoothly tapering confining wall formed from the sheet of material in the shape of a hollow open ended truncated cone having an open minor upper end and an open major lower end of a larger diameter than the upper end; and a web of said sheet material interconnecting the lower larger diameter major ends thereof into a continuous structure with the lower major ends being in coplanar relation and with the seedlings grown in said growth zones being selectively registerable through the open major lower ends with the drop tube so that they may be readily removed from the lower larger diameter major ends into the drop tube with a minimum disturbance of the plants.

\* \* \* \* \*